United States Patent
Udagawa

(10) Patent No.: US 6,997,462 B2
(45) Date of Patent: Feb. 14, 2006

(54) CYLINDER HEAD GASKET

(75) Inventor: Tsunekazu Udagawa, Ichikawa (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/049,880

(22) Filed: Feb. 4, 2005

(65) Prior Publication Data
US 2005/0179211 A1 Aug. 18, 2005

(30) Foreign Application Priority Data
Feb. 4, 2004 (JP) ............... 2004-028313

(51) Int. Cl.
F02F 11/00 (2006.01)
(52) U.S. Cl. ..................... 277/593; 277/595
(58) Field of Classification Search ............... 277/593, 277/594, 595, 600
See application file for complete search history.

(56) References Cited

U.S. PATENT DOCUMENTS

| 4,898,396 | A | * | 2/1990 | Udagawa | 277/592 |
|---|---|---|---|---|---|
| 4,938,488 | A | * | 7/1990 | Udagawa et al. | 277/595 |
| 5,054,795 | A | * | 10/1991 | Udagawa et al. | 277/593 |
| 5,076,595 | A | * | 12/1991 | Udagawa | 277/595 |
| 5,549,307 | A | | 8/1996 | Capretta et al. | |
| 5,853,175 | A | * | 12/1998 | Udagawa | 277/595 |
| 5,873,577 | A | * | 2/1999 | Inamura | 277/594 |
| 5,957,463 | A | * | 9/1999 | Inamura | 277/593 |
| 6,056,295 | A | * | 5/2000 | Udagawa | 277/595 |
| 6,089,572 | A | * | 7/2000 | Plunkett | 277/592 |
| 6,139,025 | A | * | 10/2000 | Miyaoh | 277/593 |
| 6,161,842 | A | * | 12/2000 | Miyaoh | 277/653 |
| 6,257,591 | B1 | * | 7/2001 | Abe et al. | 277/591 |
| 6,318,733 | B1 | * | 11/2001 | Udagawa | 277/596 |

FOREIGN PATENT DOCUMENTS

| EP | 1 308 653 | 5/2003 |
|---|---|---|
| JP | H04-33490 | 8/1992 |
| JP | 2001-173786 | * 6/2001 |

* cited by examiner

Primary Examiner—Alison K. Pickard
(74) Attorney, Agent, or Firm—Manabu Kanesaka

(57) ABSTRACT

A cylinder head gasket is provided for an engine with low rigidity and a high maximum pressure. In the cylinder head gasket, it is possible to enhance the secondary sealing without greatly affecting the primary sealing. The cylinder head gasket is formed of a first metal plate with a first full bead under a folded portion around a cylinder bore, and a second metal plate with a second full bead around the first full bead. The second metal plate is made of a material with elasticity greater than that of the first metal plate, and is arranged with a gap relative to an outer edge of the folded portion so as not to overlap. The first full bead and the second full bead have top portions facing in opposite directions.

8 Claims, 3 Drawing Sheets

CYLINDER HEAD GASKET

BACKGROUND OF THE INVENTION AND RELATED ART STATEMENT

The present invention relates to a cylinder head gasket placed between two members such as a cylinder head and a cylinder block of an internal combustion engine.

When joint surfaces between a cylinder head and a cylinder block (cylinder body) of an automobile engine are sealed, a metal cylinder head gasket is placed between the cylinder head and the cylinder block to seal combustion gas, coolant water, and lubrication oil.

Such a cylinder head gasket has been changed from a laminated type having many layers of metal plates to a simple structure type composed of one or two metal plates for reducing a weight and production cost of an engine. Since only one or two structural plates are used, usable materials are limited for reducing a weight of an engine. A type and the number of sealing methods are limited, so that it is necessary to use a relatively simple sealing method.

As a weight and size of an engine have been reduced recently, the engine tends to have lower rigidity. Upon sealing with the cylinder head gasket, when a large sealing surface pressure is applied around a cylinder bore, the cylinder bore tends to deform. Accordingly, it is difficult to obtain sufficient sealing performance.

A laminated metal gasket 1X has been proposed, for example, as shown in FIG. 5 (see Patent Reference 1). Plural beads formed of a first bead 6X and a second bead 2X encircle a hole H to be sealed, and is sequentially shifted from the hole H. Top portions of the full beads 6X and 2X alternately face in opposite directions. That is, two bead plates, i.e., a first bead plate 8X and a second bead plate 2X, are overlapped such that the bead plates protrude inwardly with each other. The first bead plate 8X is folded at a side of the hole H, which is overlapped with the second bead plate 2X.

With this structure, it is possible to increase a portion of the bead for generating a surface pressure to a desired width. Accordingly, it is possible to reduce a thickness of the gasket and improve sealing performance.

However, in such a structure, the second hull bead 2X of the second bead plate 4X enters the folded portion of the first bead plate 8X. Accordingly, a pressure generated with the second bead plate 4X interferes with a pressure generated with the first bead plate 8X. As a result, when a primary sealing portion formed of the first full bead 6X and the folded portion and a secondary sealing portion formed of the second full bead 2X are designed to obtain a specific pressure distribution around the hole H to be sealed, it is necessary to consider the interference, thereby making it difficult to design and produce the cylinder head gasket. Therefore, the cylinder head gasket with such a structure may not be able to sufficiently seal a cylinder bore of a recent engine with lower rigidity and a smaller size.

Patent Reference 1: Japanese Utility Model Publication (Kokoku) No. 04-33490.

In view of the problems described above, an object of the present invention is to provide a cylinder head gasket for an engine with low rigidity and a high maximum pressure (Pmax), in which it is possible to improve a secondary sealing without greatly influencing a primary sealing in the primary sealing and secondary sealing formed of two hull beads around a cylinder bore.

Further objects and advantages of the invention will be apparent from the following description of the invention.

SUMMARY OF THE INVENTION

In order to attain the objects described above, according to the present invention, a cylinder head gasket is formed of a first metal plate having a first full bead around a cylinder bore under a folded portion around the cylinder bore, and a second metal plate having a second full bead around the first full bead. The second metal plate is formed of a material different from and having elasticity greater than that of the first metal plate. The second metal plate is arranged adjacent to the folded portion with a gap so as not to overlap. Further, top portions of the first full bead and second full bead protrude in opposite directions.

With this structure, the second metal plate does not enter the folded portion. Accordingly, when a secondary sealing formed of the second full bead is strengthened, a primary sealing formed of the first hull bead is not greatly affected. The second metal plate is formed of the different material having elasticity greater than the first metal plate. Accordingly, the second metal plate has elasticity and compressibility greater than the first metal plate, thereby making it possible to deal with various conditions.

The first full bead and the second full bead protrude inwardly, or have dents outwardly. Accordingly, the top portions of the full beads do not directly contact an engine member, thereby preventing the beads from being hit and deformed due to a vibration of the engine member, called Brinelling.

The first metal plate may be formed of steel plate, and the second metal plate may be formed of stainless steel plate (SUS). When the second metal plate is formed of a spring material, the secondary sealing has an improved following ability. Further, the second full bead formed in the second metal plate may have a height greater than that of the first full bead, or the second full bead formed in the second metal plate may have a width smaller than that of the first full bead. Accordingly, it is possible to increase a surface pressure generated with the second full bead to enhance the secondary sealing portion, thereby improving sealing performance.

In the cylinder head gasket of the present invention, the second metal plate with the second hull bead does not enter the folded portion of the first metal plate with the first full bead. Accordingly, it is possible to enhance the secondary sealing formed of the second full bead without greatly influencing the primary sealing formed of the first hull bead.

The second metal plate is formed of the different material having elasticity greater than the first metal plate. Accordingly, the elasticity and compressibility of the second full bead can be made extremely greater than that of the first full bead. Thus, the first metal plate and the second metal plate formed of the different materials with different properties are combined to deal with various conditions, thereby improving overall sealing performance.

The first full bead and the second full bead protrude inwardly, or have recesses outwardly, so that the top portions of the full beads do not directly contact an engine member. Accordingly, it is possible to prevent Brinelling in which the beads are hit and deformed due to a vibration of the engine member.

When the second metal plate with the second hull bead is formed of spring material, the secondary sealing has an improved following ability, thereby enhancing the secondary sealing.

DETAILED DESCRIPTION OF PREFERRED EMBODIMENTS

Hereunder, a cylinder head gasket according to embodiments of the present invention will be explained with reference to the accompanying drawings.

A cylinder head gasket 1 according to embodiments of the present invention is a laminated metal gasket to be placed between a cylinder head and a cylinder block (cylinder body) for sealing combustion gas with a high pressure and high temperature, and fluid such as coolant water and oil in a coolant passage and cooling oil passage.

Figure 2:
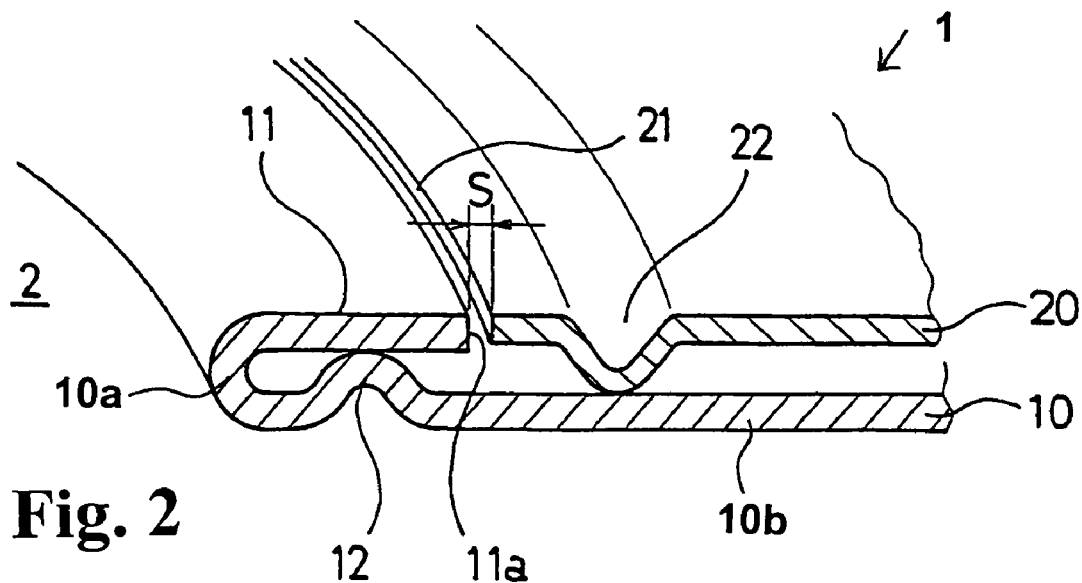
FIG. 2 is a partial perspective sectional view showing a structure of the cylinder head gasket according to a first embodiment of the present invention.
Figure 3:
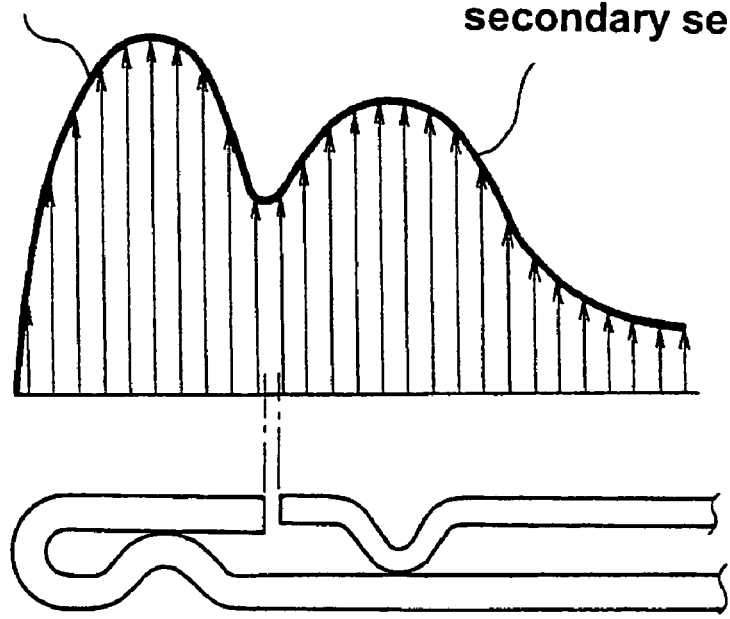
FIG. 3 is a graph showing a pressure distribution in the cylinder head gasket shown in FIG. 2.
Figure 4:
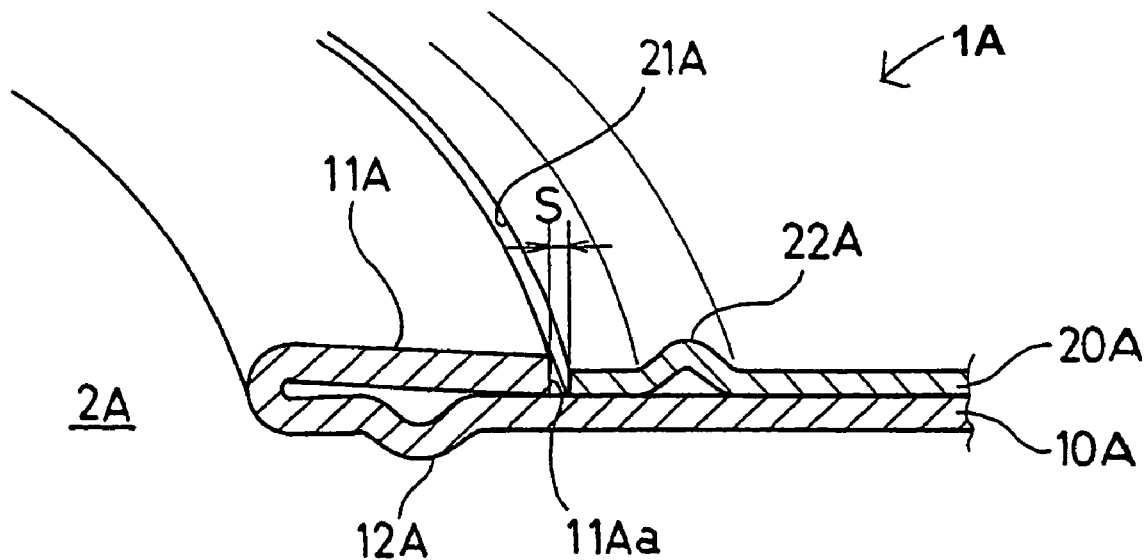
FIG. 4 is a partial perspective sectional view showing a structure of the cylinder head gasket according to a second embodiment of the present invention.
Figure 5:
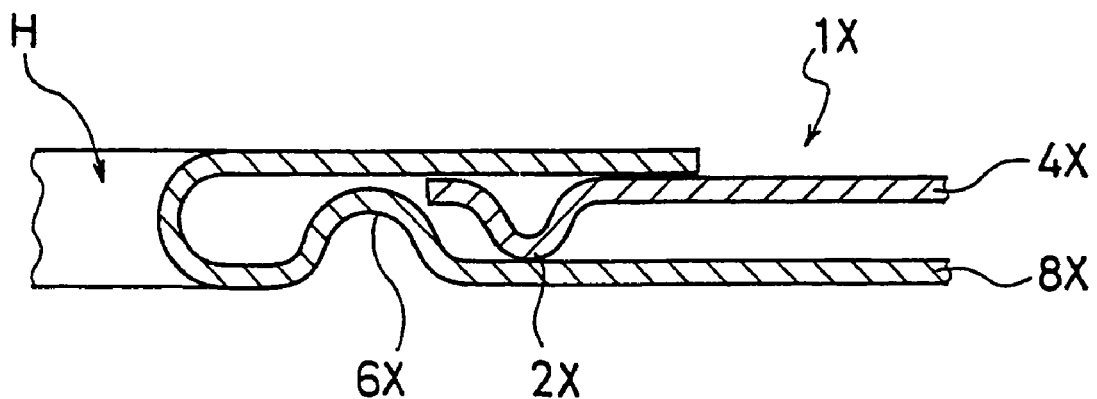
FIG. 5 is a partial perspective sectional view showing a structure of a conventional cylinder head gasket.

FIGS. 2 to 4 are schematic explanatory views in which a thickness of the cylinder head gasket 1, and sizes and aspect ratios of a bead and a surface pressure supporting plate are different from actual ones for emphasizing a sealing portion for the sake of explanation.

Figure 1:
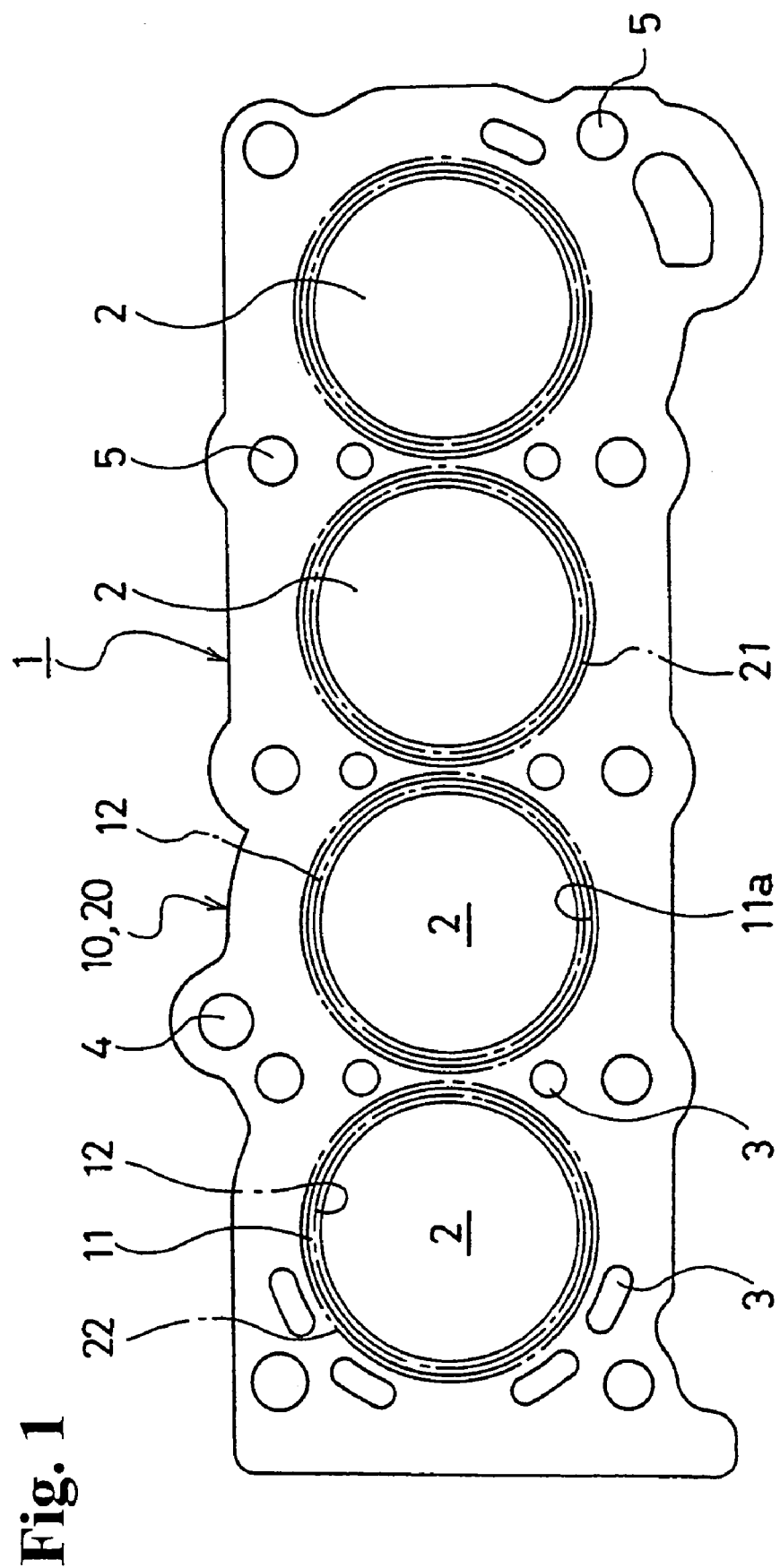
FIG. 1 is a plan view of a cylinder head gasket according to embodiments of the present invention.

As shown in FIGS. 1 and 2, according to a first embodiment of the present invention, the cylinder gasket 1 is formed of two metal plates, i.e., a first metal plate 10 and a second metal plate 20. The first metal plate 10 is made of annealed stainless steel (annealed material), or soft steel. The second metal plate 20 is made of a spring material (spring steel, stainless steel) with greater elasticity.

The metal plates 10 and 20 are formed in a shape corresponding to a shape of an engine part such as a cylinder block. As shown in FIG. 1, the metal plates 10 and 20 are provided with cylinder bores 2, coolant water holes 3, oil holes 4 for circulating oil, and bolt holes 5 for tightening bolts.

The metal plate 10 is provided with a folded portion 11 as a sealing member around the cylinder bore 2 to be sealed. Further, a first full bead 12 is formed under the folded portion 11 to protrude inwardly, or dent outwardly. Namely, a curved portion 10a is formed at a base portion 10b to define the cylinder bore 1, and the folded portion or flange 11 extends from the curved portion 10a. The bead 12 is located on the base portion 10b under the flange 11.

The second metal plate 20 overlaps with the first metal plate 10 with a gap S outside the folded portion 11 so as not to overlap with the folded portion 11. Namely, the second metal plate 20 is formed with a hole 21 with an inner peripheral edge greater than an outer peripheral edge 11a of the folded portion 11.

The second metal plate 20 is provided with a second hull bead 22 around the outer edge 11a of the folded portion 11 to protrude inwardly, or dent outwardly. The first full bead 12 and the second full bead 22 both protrude inwardly. Accordingly, top portions of the beads 12 and 22 do not directly contact engine members, thereby preventing Brinelling in which the bead is hit and deformed due to a vibration of the engine member.

With this structure, a primary sealing is formed of the first hull bead 12 and the folded portion 11 around the cylinder bore 2, and a secondary sealing is formed of the second full bead 22 around the primary sealing. As a result, it is possible to obtain a pressure distribution shown in FIG. 3.

The second metal plate 20 with the second hull bead 22 does not enter the folded portion 11 of the first metal plate 10 with the first full bead 12. That is, the folded portion 11 does not overlap with the second metal plate 20 and the second full bead 22. Accordingly, the first metal plate 10 does not greatly affect the secondary sealing formed of the second full bead 22.

Further, there is the gap S between the second metal plate 20 with the second full bead 22 and the folded portion 11. Accordingly, when the gasket 1 is pressed and compressed, and the second full bead 22 is compressed, the folded portion 11 is not influenced. Accordingly, the second metal plate 20 doe not greatly affect the folded portion 11 and the primary sealing formed of the first full bead 12.

That is, there is little interference between the first full bead 12 and the second full bead 22. Accordingly, it is possible to enhance the secondary sealing formed of the second full bead 22 without greatly affecting the primary sealing formed of the first full bead 12.

The second metal plate 20 is made of a spring material with elasticity greater than the first metal plate 10. Accordingly, it is possible to increase elasticity, compressibility, and following ability of the second full bead 22 greater than the first full bead 12. Accordingly, the first metal plate 10 and the second metal plate 20 formed of the different materials with different properties are combined to deal with various conditions, thereby improving overall sealing performance.

With this structure, the first full bead 12 is disposed closely around the cylinder bore 2 for generating a proper surface pressure. The second full bead 22 is disposed at a periphery away from the cylinder bore 2, and can follow a variation in a gap between engine members due to vibration of the engine members. Accordingly, with the first full bead 12 and the second full bead 22, it is possible to obtain sufficient sealing.

Further, the second full bead 22 has high elasticity and compressibility, thereby obtaining sufficient sealing while preventing a deformation of a cylinder bore.

The second full bead 22 formed in the second metal plate 20 may have a height greater than that of the first full bead 12. Or, the second full bead 22 formed in the second metal plate 20 may have a width smaller than that of the first full bead 12. Accordingly, it is possible to increase a surface pressure generated with the second full bead 22, thereby enhancing the secondary sealing and improving sealing performance.

A cylinder head gasket 1A shown in FIG. 4 according to a second embodiment of the present invention will be explained next. The cylinder head gasket 1A according to the second embodiment of the present invention has a structure substantially same as that of the cylinder head gasket 1 in the first embodiment. As a difference from the first embodiment, the first full bead 12 under the folded portion 11 dents inwardly or protrudes outwardly, and the second full bead 22 dents inwardly or protrudes outwardly. In this case, the top portions of the beads 12 and 22 directly contact engine members. However, similar to the cylinder head gasket 1 in the first embodiment, there is little interference between the first full bead 12 and the second full bead 22. Accordingly, it is possible to enhance the secondary sealing formed of the second full bead 22 without greatly affecting the primary sealing formed of the first full bead 12.

The disclosure of Japanese Patent Application No. 2004-028313, filed on Feb. 4, 2004, is incorporated in the application.

While the invention has been explained with reference to the specific embodiments of the invention, the explanation is illustrative and the invention is limited only by the appended claims.

What is claimed is:

1. A cylinder head gasket comprising:
   a first metal plate having a base portion, a first hole formed in the base portion, a curved portion extending from the base portion for defining the first hole, a flange extending from the curved portion to be located above the base portion, and a first full bead formed on the base portion and under the flange to surround the first hole, said first full bead forming a primary sealing pressure when the gasket is compressed, and
   a second metal plate disposed on the base portion at a side of the flange, and having a second hole to receive the flange therein with a gap relative to an outer edge of the flange, and a second full bead protruding in a direction opposite to that of the first full bead to form a secondary sealing pressure when the gasket is compressed, said secondary sealing pressure being less and wider than the primary sealing pressure and formed outside the primary sealing pressure with a reduced pressure portion therebetween formed by the gap, said second metal plate being formed of a material having elasticity greater than that of the first metal plate.

2. A cylinder head gasket according to claim 1, wherein said second metal plate is formed of a spring material.

3. A cylinder head gasket according to claim 1, wherein said second full bead has a height greater than that of the first full bead.

4. A cylinder head gasket according to claim 1, wherein said first and second full beads are oriented to face each other.

5. A cylinder head gasket according to claim 1, wherein said first and second beads are oriented to face away from each other.

6. A cylinder head gasket according to claim 4, wherein said first full bead directly contacts the flange when the gasket is compressed.

7. A cylinder head gasket according to claim 1, consisting essentially of said first and second metal plates laminated together directly.

8. A cylinder head gasket comprising:
   a first metal plate having a base portion, a first hole formed in the base portion, a curved portion extending from the base portion for defining the first hole, a flange extending from the curved portion to be located above the base portion, and a first full bead formed on the base portion under the flange to surround the first hole, and
   a second metal plate disposed on the base portion at a side of the flange, and including a second hole to receive the flange therein with a gap relative to an outer edge of the flange, and a second full bead protruding in a direction opposite to that of the first full bead and having a width small than that of the first full bead, said second metal plate being formed of a material having elasticity greater than that of the first metal plate.

* * * * *